Figures 1, 2:
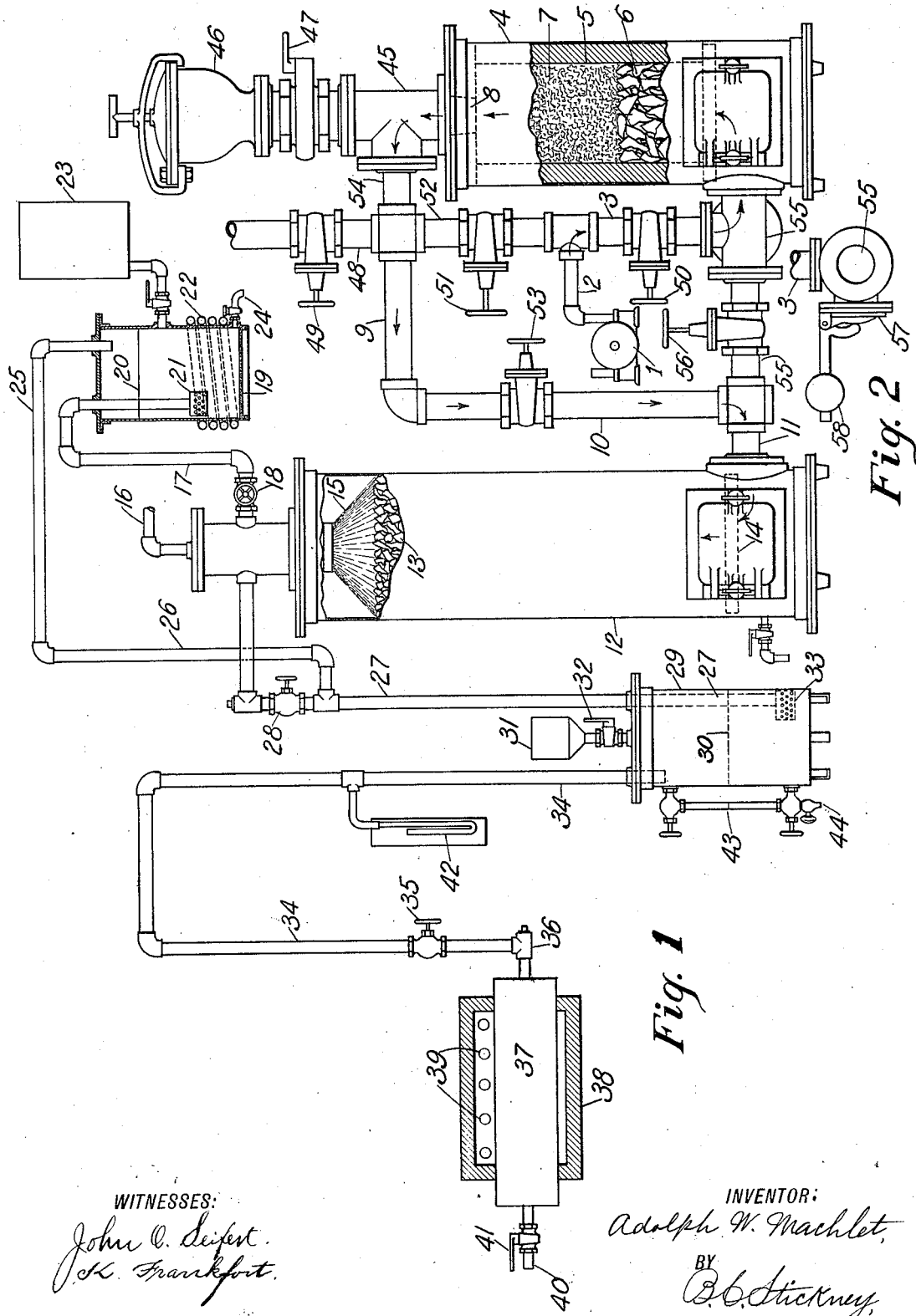

A. W. MACHLET.
CASE HARDENING.
APPLICATION FILED APR. 13, 1909.

1,152,959.

Patented Sept. 7, 1915.

WITNESSES:
John O. Seifert
JK. Frankfort

INVENTOR:
Adolph W. Machlet,
BY
O.C. Stickney
ATTORNEY

UNITED STATES PATENT OFFICE.

ADOLPH W. MACHLET, OF ELIZABETH, NEW JERSEY.

CASE-HARDENING.

1,152,959.    Specification of Letters Patent.    Patented Sept. 7, 1915.

Application filed April 13, 1909.   Serial No. 489,576.

*To all whom it may concern:*

Be it known that I, ADOLPH W. MACHLET, a citizen of the United States, residing in Elizabeth, in the county of Union and State of New Jersey, have invented certain new and useful Improvements in Case-Hardening, of which the following is a specification.

This invention relates principally to case-hardening steel and iron articles.

The principal object of the invention is to provide means for producing expeditiously and at low cost a high quality of case-hardened shells or crusts upon metal articles.

In my application No. 416,602, filed February 18, 1908, the articles are heated in a suitable retort into which is introduced a carbon or hydro-carbon in a fluid form, and greatly thinned by an inert gas consisting largely of carbon monoxid and nitrogen, the two latter produced in a gas producer by passing a current of compressed air through a body of incandescent charcoal; the resultant gases being led through a body of naphtha or other volatile or vaporizable oil, to become charged with hydrocarbon vapor, whence they pass slowly through the case-hardening retort; the hydro-carbon vapor being the carburizing agent, and the compressed air originally supplied to the apparatus furnishing the power which moves the current through the case-hardening retort.

According to the present invention a large body of peat moss is placed in the gas producer above the charcoal, and becomes heated, and gives off ammonia or ammoniacal compounds or nitrogenous substances. The compressed air passes through the incandescent charcoal and peat moss, and the resultant gas, consisting largely of carbon monoxid, nitrogen (both of which are derived from the compressed air) and nitrogenous or ammoniacal gas, is passed through a body of naphtha or oil, and thence into the case-hardening retort. Other substances may be used instead of peat moss to yield ammoniacal or nitrogenous substances, such for instance as leather or any of a great variety of animal substances or products. Steel or iron articles treated in this way are found to be excellently case-hardened, the case-hardened portion having a fine grain and other good qualities. Still better results may be obtained by passing products of the gas producer through ammonia water before it is led to the naphtha or oil; the effect of passing it through the ammonia water being to charge or supercharge it with ammonia, which also takes up the oil and contributes materially to the celerity and efficacy of the case-hardening operation; so that the very high grade of case-hardening may be performed easily at very low cost. Said application covers the apparatus employed, while the present application is restricted to processes, certain features of which are disclosed in said application.

In the accompanying drawings, Figure 1 is a diagrammatic elevation of an apparatus for carrying out several features of the present invention. Fig. 2 is a side elevation of a safety valve for a gas producer.

Air under pressure is supplied from a pump or blower 1 through a pipe 2 to a vertical pipe 3 placed at the side of a gas producer 4, the latter usually in the form of an upright cylindrical body and containing a fire chamber 5, in the bottom of which is a body of charcoal 6; the top of the fire chamber being filled by a body of peat moss 7. The air from the pipe 2 passes down through pipe 3 and into the bottom of the furnace, as indicated by the arrows. The current goes up through the incandescent charcoal and peat moss 6, 7 and through outlet 8, and then through a horizontal pipe 9 and vertical pipe 10 into horizontal pipe 11, and thence into a scrubber 12 of the usual type, and containing a body of coke 13 resting upon a grate 14 and cleaned by a spray of water 15 admitted into the top of the scrubber by a supply pipe 16. From the top of the scrubber a pipe 17 (provided with a valve 18) leads to a receptacle 19 in which is placed water 20, which is charged with ammonia. The pipe 17 terminates in a spray 21 below the surface of the ammonia water, so as to facilitate charging of the gas with the ammonia. The receptacle 19 may be heated by a coil 22 or otherwise. It may be supplied with ammonia water from a tank 23; and the spent water may be drawn off through an outlet 24. The gas now charged with ammonia passes out through a pipe 25, 26, and thence into a pipe 27 provided above the pipe 26 with a valve 28. The mixture passes down the pipe 27 into a tank 29 containing naphtha or other hydrocarbon liquid 30, said liquid supplied from any suitable vessel 31, and the supply being regulated by a valve 32. The bottom of the pipe 27 terminates at the bottom of the tank 29 in the form of a spray 33, so that the gas bubbles pass up through the naphtha and become charged therewith. Then they escape from the tank through a pipe 34 which opens into the top of the tank. The pipe 34 is provided with a valve 35 and terminates in a gland 36, leading into a revoluble retort 37 mounted in a furnace 38 and having controlled burners 39 for air and gas, and also having a constricted vent 40 regulatable by a valve 41. The pump 1 forces the current through the gas producer, the scrubber 12, the ammonia tank 19, the naphtha tank 29, and the retort 37. The retort and furnace may be of the general construction illustrated in U. S. Letters Patent No. 884,180 of April 7, 1908; the retort being rotatable for the purpose of agitating the articles to expose them on all sides evenly to the action of the carburizing gas. The pipe 34 may be provided with a pressure gage 42, and the tank 29 may be provided with a gage-glass 43 and a pet-cock 44.

The very highest grade of case-hardening may be done by the described method, and at very low cost, owing to the cheapness of the gas derived from the charcoal and peat moss or the like, and to the inexpensiveness of the ammonia water.

The outlet 45 of the gas producer is surmounted by a hopper 46 for introducing charcoal or peat moss or the like; which may be deposited in the furnace either layer upon layer as shown, or in a mixed condition. A gate 47 is provided between the hopper and the outlet 45. From the pipe 9 extends upwardly a vent pipe 48 having a valve 49, for convenience in starting the producer in operation; said valve 49 being open for this purpose, but closed during the case-hardening operation.

When desired, the current of air may be caused to flow down to the producer, and out at the bottom thereof to the scrubber 12. In order to do this, a valve 50 in pipe 3 is closed and a valve 51 in a pipe 52 leading up from pipe 2 is opened; and a valve 53 in pipe 10 is closed, so that air goes up through pipe 52, and then through pipes 54 and 45 in the top of the furnace. From the bottom of the furnace, air is led out through pipes 55 and 11 to the scrubber; a valve 56 in pipe 55 being open. This provision is made because for some classes of work it is found desirable to reverse the current through the gas producer. The pipe 55 is provided with a safety valve 57 provided with a weight 58, Fig. 2.

It will be seen that the furnace has at its bottom a pipe 55, 11 communicating indirectly with the retort 37, and from said pipe there extends upwardly a second pipe 3, 52 above the top of the furnace; valves 50, 51 being provided in said upright pipe, and that there is a source of supply of air under pressure communicating with the second pipe between said valves. The pipe or conduit 11 may be said to have branches 55 and 10, one communicating with the bottom of the furnace and the other with the top thereof; valves 56 and 53 provided in said branches, and a pipe 3, 52 communicating with said branches and having the two valves 50 and 51 between which is connected the supply pipe 52.

Variations may be resorted to within the scope of the invention, and portions of the improvements may be used without others.

Having thus described my invention, I claim:

1. The process of case-hardening steel or iron articles, consisting in exposing them while heated to an atmosphere of carbon-monoxid and ammonia charged with oil or oily vapor.

2. The process of case-hardening steel or iron articles, consisting in subjecting them, while uniformly heated by controlled heat, to a current of carbon-monoxid and ammonia charged with naphtha.

3. The process of case-hardening steel or iron articles, consisting in subjecting them, while heated, to an atmosphere comprising air which has been passed through heated ammonia-yielding and carbon-yielding materials, and to gas or vapor containing carbon or hydrocarbon.

4. The process of case-hardening steel or iron articles, consisting in subjecting them, while heated, to an atmosphere comprising air which has been passed through both a heated body of nitrogenous organic matter and a contiguous body of incandescent charcoal, and also charged with oil.

5. The process of case-hardening steel or iron articles, consisting in subjecting them, while heated, to an atmosphere comprising air which has been passed through an incandescent or heated body of nitrogenous organic matter, and then through an oil.

6. The process of case-hardening steel or iron articles, consisting in subjecting them, while heated, to an atmosphere comprising air which has been passed first through incandescent charcoal and nitrogenous organic matter, and then through an oil.

7. The process of case-hardening steel or iron articles, consisting in subjecting them, while heated, to an atmosphere comprising air which has been passed through a body of incandescent charcoal, and nitrogenous organic matter, and then through an oil.

8. The process of case-hardening steel or iron articles, consisting in subjecting them, while heated, to a current of air which has been passed through an incandescent body of charcoal and charged with ammonia, and then passed through an oil.

9. The process of case-hardening steel or iron articles, consisting in exposing them while heated to an atmosphere of carbon-monoxid and ammonia, which has been passed through ammonia water and then charged with an oil.

10. The process of case-hardening steel or iron articles, consisting in subjecting them while uniformly heated by controlled heat to a current of carbon-monoxid and ammonia which has been passed through ammonia water and then charged with naphtha.

11. The herein-described process of case-hardening steel or iron articles, which consists in exposing them, while heated, to an oil-charged gaseous atmosphere containing carbon-monoxid.

12. The herein-described process of case-hardening steel or iron articles, which consists in exposing them, while heated, to a naphtha-charged, gaseous atmosphere containing carbon-monoxid.

13. The herein-described process of case-hardening steel or iron articles, which consists in exposing them, while heated, to an oil-charged, gaseous atmosphere containing carbon-monoxid and a nitrogenous substance.

14. The herein-described process of case-hardening steel or iron articles, which consists in exposing them, while heated, to a naphtha-charged, gaseous atmosphere containing carbon-monoxid and a nitrogenous substance.

ADOLPH W. MACHLET.

Witnesses:
SAMUEL R. OGDEN,
GEORGE MACHLET, Jr.